(12) United States Patent
Abraham et al.

(10) Patent No.: US 7,607,719 B2
(45) Date of Patent: Oct. 27, 2009

(54) METHOD FOR INCREASING THE CRASH RESISTANCE OF A MOTOR VEHICLE, AND BLOCK ELEMENT USED THEREWITH

(75) Inventors: Frank Abraham, Bissendorf (DE); Stefan Klumpe, Wallenhorst (DE)

(73) Assignee: Wilhelm Karmann GmbH (DE)

( * ) Notice: Subject to any disclaimer, the term of this patent is extended or adjusted under 35 U.S.C. 154(b) by 270 days.

(21) Appl. No.: 11/470,767

(22) Filed: Sep. 7, 2006

(65) Prior Publication Data
US 2007/0273174 A1 Nov. 29, 2007
US 2008/0203759 A9 Aug. 28, 2008

Related U.S. Application Data

(63) Continuation of application No. PCT/DE2005/000338, filed on Mar. 1, 2005.

(30) Foreign Application Priority Data
Mar. 9, 2004 (DE) ........................ 10 2004 011 786

(51) Int. Cl.
*B60J 5/04* (2006.01)
(52) U.S. Cl. .................. 296/187.03; 296/187.12; 296/207; 296/146.9
(58) Field of Classification Search .......... 296/187.03, 296/187.09, 187.12, 207, 146.1, 146.9, 193.05, 296/196.06; 49/483.1
See application file for complete search history.

(56) References Cited

U.S. PATENT DOCUMENTS

| | | | | |
|---|---|---|---|---|
| 4,936,621 A | * | 6/1990 | Shimoda et al. | 296/187.12 |
| 4,981,321 A | * | 1/1991 | Watanabe et al. | 296/155 |
| 5,421,124 A | * | 6/1995 | Zuccaro | 49/381 |
| 5,791,723 A | * | 8/1998 | Bell et al. | 296/155 |
| 5,895,089 A | * | 4/1999 | Singh et al. | 296/207 |
| 6,183,039 B1 | * | 2/2001 | Kohut et al. | 296/155 |
| 6,206,455 B1 | * | 3/2001 | Faubert et al. | 296/155 |
| 6,349,989 B1 | * | 2/2002 | Kim | 296/207 |
| 6,607,238 B2 | * | 8/2003 | Barz | 296/187.09 |
| 6,676,201 B2 | * | 1/2004 | Im et al. | 296/207 |
| 7,021,697 B2 | * | 4/2006 | Bodin et al. | 296/146.6 |
| 7,059,654 B2 | * | 6/2006 | Ichinose | 296/146.1 |
| 7,097,229 B1 | * | 8/2006 | Chernoff | 296/146.1 |
| 7,156,448 B2 | * | 1/2007 | Armbruster et al. | 296/146.6 |
| 7,163,259 B2 | * | 1/2007 | Hayashi | 296/204 |
| 7,344,181 B2 | * | 3/2008 | Koshimichi | 296/146.9 |

FOREIGN PATENT DOCUMENTS

| | | |
|---|---|---|
| EP | 0 779 171 A1 | 6/1997 |
| EP | 0 818 339 A1 | 1/1998 |
| JP | 2003095034 | 4/2003 |

* cited by examiner

*Primary Examiner*—Glenn Dayoan
*Assistant Examiner*—Gregory Blankenship
(74) *Attorney, Agent, or Firm*—Fulbright & Jaworski, LLP

(57) ABSTRACT

The invention relates to a method for increasing the crash resistance of a motor vehicle in the vicinity of the front bodywork pillar (A-pillar), especially as regards forces which act in conjunction with an offset front impact (offset crash) on the bodywork. The invention also refers to a blocking element, as is used in such a method, and to a motor vehicle fitted with such a blocking element.

20 Claims, 6 Drawing Sheets

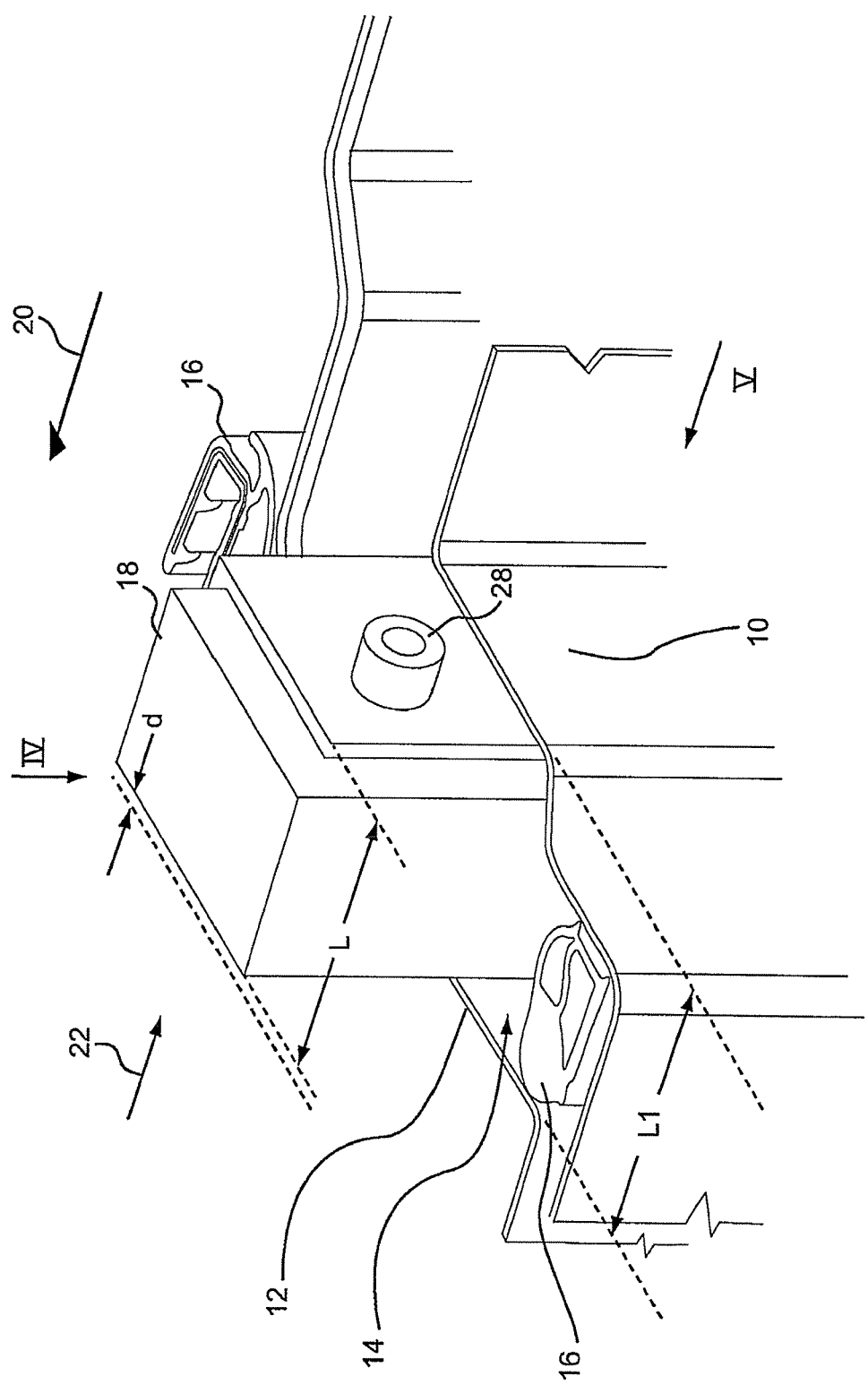

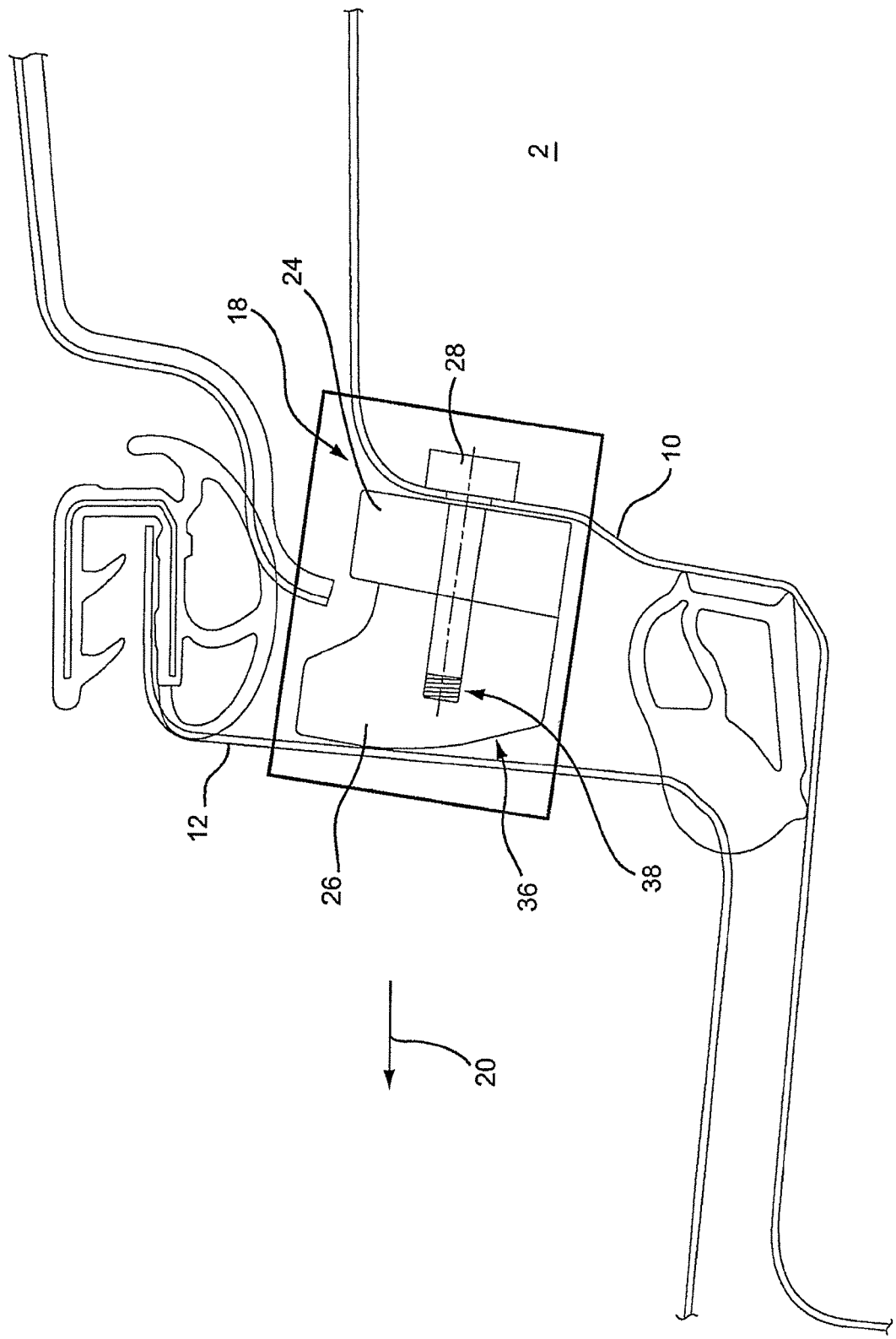

METHOD FOR INCREASING THE CRASH RESISTANCE OF A MOTOR VEHICLE, AND BLOCK ELEMENT USED THEREWITH

CROSS-REFERENCE TO RELATED APPLICATIONS

This is a national stage filing of PCT/DE2005/000338 filed Mar. 1, 2005 claiming priority to DE 10 2004 011 786.1 filed Mar. 9, 2004.

TECHNICAL FIELD

The invention relates to a method for increasing the crash resistance of a motor vehicle in the vicinity of the front bodywork pillar (A-pillar), especially as regards forces which act in conjunction with an offset front impact (offset crash) on the bodywork. The invention also refers to a blocking element, as is used in such a method, and to a motor vehicle fitted with such a blocking element.

BACKGROUND OF THE INVENTION

Future requirements to be expected of motor vehicle bodywork (crash criteria), especially as regards so-called offset crash situations, assume that with constructive means, a situation will be achieved such that even persons who are not wearing seat belts on the front seats in such an accident situation cannot come into contact with the A-pillar with their heads (head crash protection). For fulfillment of this safety requirement, it must be ensured that, in a frontal impact, the A-pillars are not, or are not noticeably, deformed into the internal space. This can be achieved thus: that a practically unavoidable gap or intervening space produced during manufacture of the bodywork between a front face of a front door and an adjoining outer side of the A-pillar is bridged at least partially with a blocking element acting as a crash support, so that the A-pillar, especially in an offset frontal impact, is promptly in contact with the front face of the door after moving previously through a minimum deformation, and supported on the latter so that, in this way, a transfer of the impact forces via the door into the rear areas of the bodywork is possible. In addition, the door or doors are at the same time strengthened adequately by construction measures such as shaft reinforcement and side impact reinforcements, in order to be capable of absorbing and transferring the forces arising safely. By means of the measures described, a movement or deformation of the A-pillar, above all of its upper part, into the internal space is avoided or reduced to a minimum, so that the risk of head injuries through impact by a deformed A-pillar is decisively reduced. However, the fitting of the blocking element cited is associated with a relatively high adaptation cost, in which the blocking element frequently does not bridge the intervening space ideally and as a consequence of this a not insignificant risk of head injuries remains.

The problem for the invention is to create an improved method for increasing the crash resistance of a motor vehicle in which, in an intervening space between a front face of a front door, adjoining an A-pillar and an outer side of the A-pillar facing the former, a blocking element is fitted, in which the assembly also will be significantly eased.

BRIEF SUMMARY OF THE INVENTION

According to the invention, this problem will be solved by means of such a method, which is characterized by the following steps: provision of a blocking element, having two blocking parts, which are connected with each other such that they are movable relative to each other under the action of a setting force into an initial state, whereby a longitudinal dimension of the blocking element is adjustable, and which can be fixed relative to each other (installed state), such that a force arising in an accident acting in the direction of the longitudinal direction or force absorption direction can be absorbed; attachment of the blocking element with the vehicle door open, in which one of the blocking parts is fastened to the front face of the vehicle door or to the outside of the A-pillar and in which the blocking parts are fitted relative to each other such that the blocking element has a greater longitudinal dimension than the intervening space with the vehicle door closed; closing of the vehicle door, in which the other blocking part comes into contact with the A-pillar or the vehicle door and the blocking parts are moved automatically relative to each other into an assembly position, in which they fundamentally bridge the intervening space completely with the door closed; and fixing of the blocking parts relative to each other in the assembly position.

To be fit for their purpose, the blocking components fundamentally have plane outer surfaces, with which they are seated against the vehicle door and the A-pillar or stand against these with a small separation. In order to simplify the adjustment process when closing the vehicle door, it can be stipulated that the blocking part which is not fixed to the vehicle (A-pillar or vehicle door) is slightly ball-shaped on its outer surface (convex on the outside), in order that the blocking component can roll when closing the vehicle door on the opposite surface, either the vehicle door or the A-pillar, and can be moved more easily into the assembly position. In any case, it is useful if the outer surfaces of the blocking parts are fundamentally parallel.

An advantageous embodiment is characterized in that the blocking parts are formed as wedges, in which the longitudinal dimension of the blocking element is adjusted while the blocking parts are moved relative to each other at an angle to the force absorption direction of the blocking element.

The blocking parts can also have mutually engaging areas, along which they are moved relative to each other to adjust the longitudinal dimension of the blocking element.

Preferably, it is stipulated that the blocking parts are fixed relative to each other by means of at least one screw. In this case, it is particularly beneficial if the blocking element is attached simultaneously to the vehicle door or the A-pillar with the at least one screw.

Alternatively, or in addition, it can be stipulated that the blocking parts are fixed relative to each other by welding into the assembly position. One of the blocking parts could also be welded to the vehicle door or the A-pillar.

To be fit for the purpose, a separator film which, for example, can be made of plastic or rubber and having a thickness of 1 mm or 2 mm (as required), is attached before fixing to the other, i.e. the unattached blocking part, and is removed after fixing, in order to guarantee a defined minimum separation of, for example, 1 mm or 2 mm between the surface of the blocking element and the adjacent painted surface (A-pillar or vehicle door).

The object of the invention is also a blocking element as crash support in a motor vehicle for bridging an intervening space between a front face of a vehicle side door adjoining an A-pillar and an outer side of an A-pillar facing the former, with two blocking parts, which are connected with each other such that they can be moved relative to each other into an initial state under the action of an adjusting force, whereby a longitudinal dimension of the blocking element is adjustable, and which can be fixed relative to each other in an assembly position, so that in an initial state a force arising in a crash in the direction of the longitudinal dimension or force absorption direction can be absorbed.

In one version, a pre-tensioned spring fitted between the blocking parts can be stipulated, by which the blocking parts are pre-tensioned into a position in which the blocking element has a maximum longitudinal dimension.

To be fit for the purpose, the blocking parts fundamentally have plane or one plane and one slightly ball-shaped (convex on the outside) outer surface(s), with which they sit against the vehicle door and the A-pillar or are opposite these with minimum separation. To be fit for the purpose, the outer surfaces are fundamentally parallel.

Preferably, it is stipulated that the blocking parts are formed as wedges, in which the longitudinal dimension of the blocking element is adjustable by lengthening the blocking parts relative to each other at an angle to the force absorption direction. Co-operating wedge-shaped surfaces or other surfaces, along which the blocking parts can be moved, can be provided with projections such as corrugations, or similar devices, in order to prevent unwanted movement after fixing.

It can be useful if the blocking parts have mutually engaging areas, along which they can be moved relative to each other, whereby the longitudinal dimension of the blocking element is adjustable.

Preferably, it is stipulated that the blocking parts can be fixed relative to each other in the assembly position by at least one screw. It is particularly beneficial if the blocking element can be attached simultaneously to the vehicle door or the A-pillar by means of the at least one screw.

Alternatively, or in addition, it can be stipulated that the blocking parts can be fixed relative to each other in the assembly position by welding.

The invention also refers to a motor vehicle with a side vehicle door fitted behind an A-pillar in which, in an intervening space between a front face of the vehicle door and an outer side of the A-pillar opposite, a blocking element bridging the intervening space when the door is closed is fitted as crash support, in which the motor vehicle is characterized by a blocking element according to the invention, in which one of the blocking parts is fixed to the front face of the vehicle door or to the outside of the A-pillar and the blocking element bridges the intervening space when the door is closed completely.

BRIEF DESCRIPTION OF THE DRAWINGS

Other advantages and features of the invention will become clear from the following description of specimen embodiments, in which reference will be made to a drawing, in which:

FIG. 3 shows a similar view to that in FIG. 2, again to a larger scale, FIG. 7 shows a version of the invention in a sectional view in the horizontal plane.

DETAILED DESCRIPTION OF THE INVENTION

Initially, reference is made to FIGS. 1 to 3 in which, in simplified schematic representations, a motor vehicle fitted with a blocking element according to the invention is illustrated and with the aid of which the method according to the invention will be explained.

Figure 1:
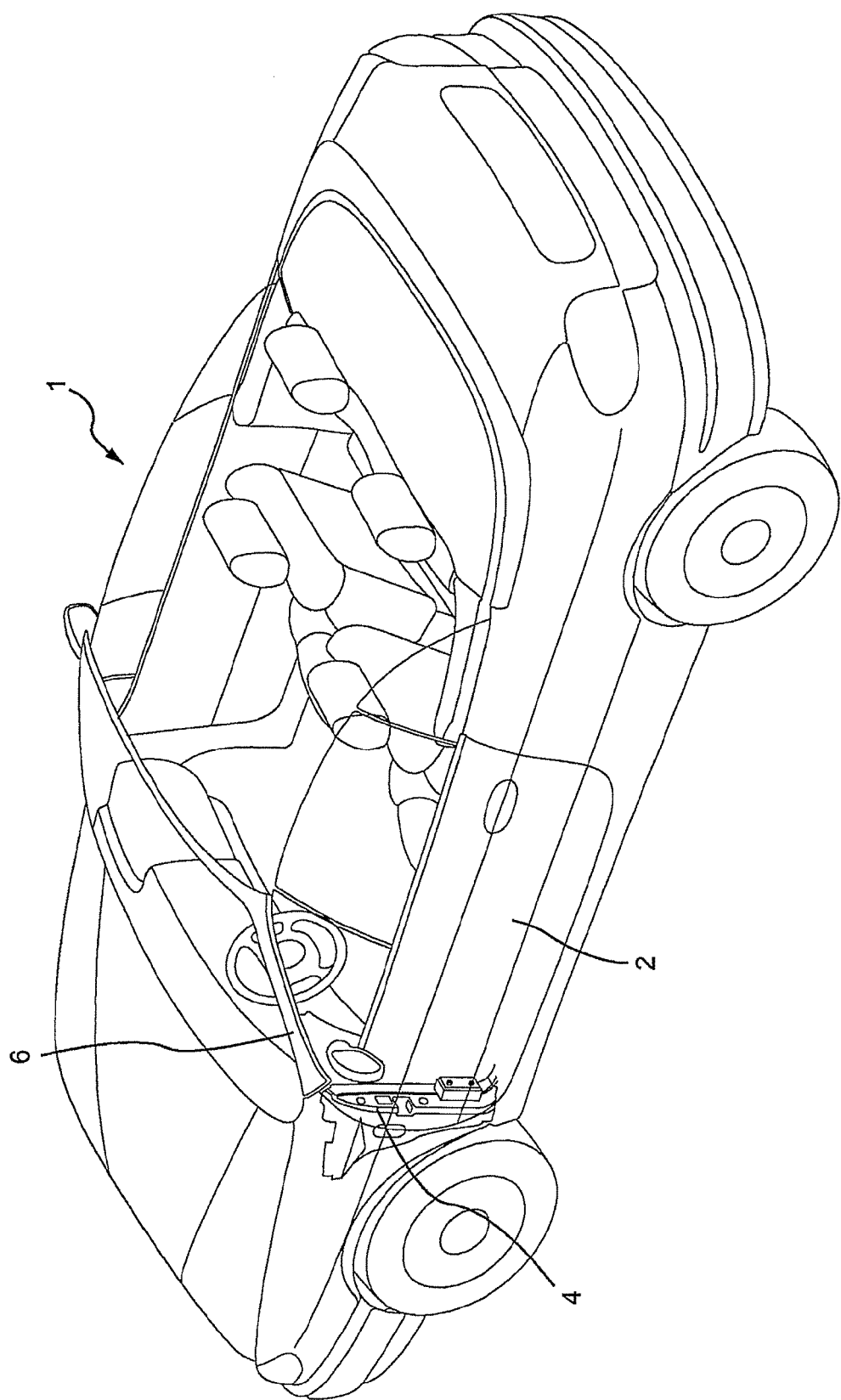
FIG. 1 shows an isometric view of a motor vehicle which is fitted with a blocking element according to the invention as crash protection.

FIG. 1 shows in an isometric view a motor vehicle 1 with a side vehicle door 2 and an A-pillar 4 fitted in the frontal area, which is continued in its upper area in the form of a windscreen frame 6. Conditioned by design, there is on all sides between the vehicle door 2 and the surrounding bodywork areas, also therefore in the vicinity of the A-pillar 4, a gap or intervening space, which on one hand is unavoidable, in order to avoid unwanted contacts between vehicle door and bodywork and, on the other hand, is used to house seals.

Figure 2:
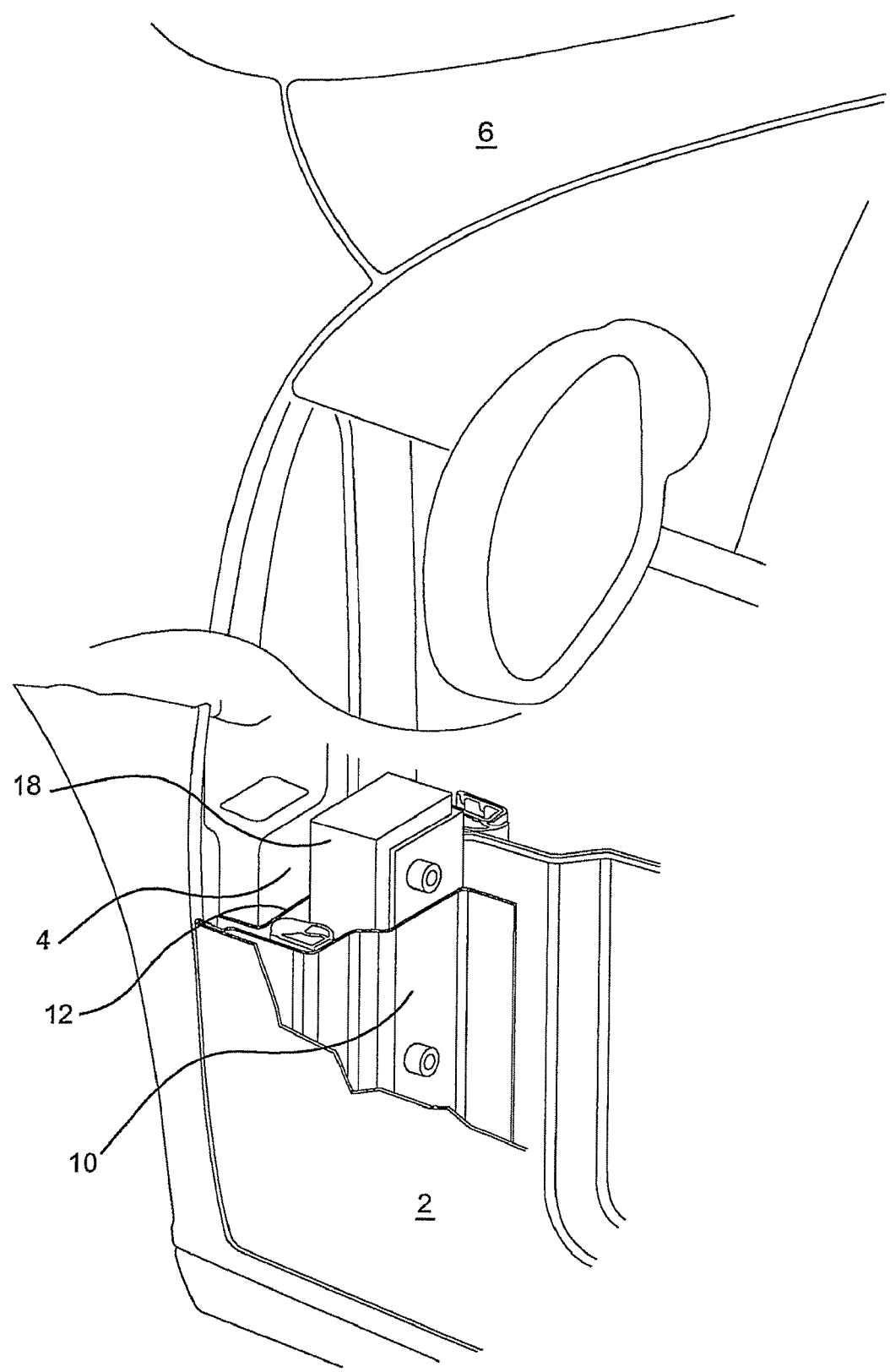
FIG. 2 shows an isometric view of the area of the blocking element from FIG. 1 to a larger scale.

As FIGS. 2 and 3 show, there is such an intervening space 14, in the side areas of which are fitted seals 16, between a front face 10 of the vehicle door 2 and an outer side 12 of the A-pillar 4 (facing against the direction of travel 20).

As FIG. 3 shows particularly clearly, there is in the intervening space 14 a blocking element 18 according to the invention, which is adapted such that its longitudinal dimension L (measured in the direction of travel 20) practically equals the corresponding longitudinal dimension L1 of the intervening space 14, i.e. L1 is equal to L plus a defined smaller space d of approximately 1 to 2 mm, so that the blocking element 18 bridges the intervening space 14 in the longitudinal direction or in the direction of travel 20 almost completely, and is on one hand in contact with the front face 10 of the vehicle door 2 and on the other hand almost in contact with the outside 12 of the A-pillar 4, when the vehicle door 2 is closed. This guarantees that, in an accident, the forces arising and acting against the direction of travel 20 (force absorption direction 22) can be transferred directly via the blocking element to the vehicle door 2 and thus can be captured, so that the A-pillar fundamentally maintains its upright position.

Figure 6:
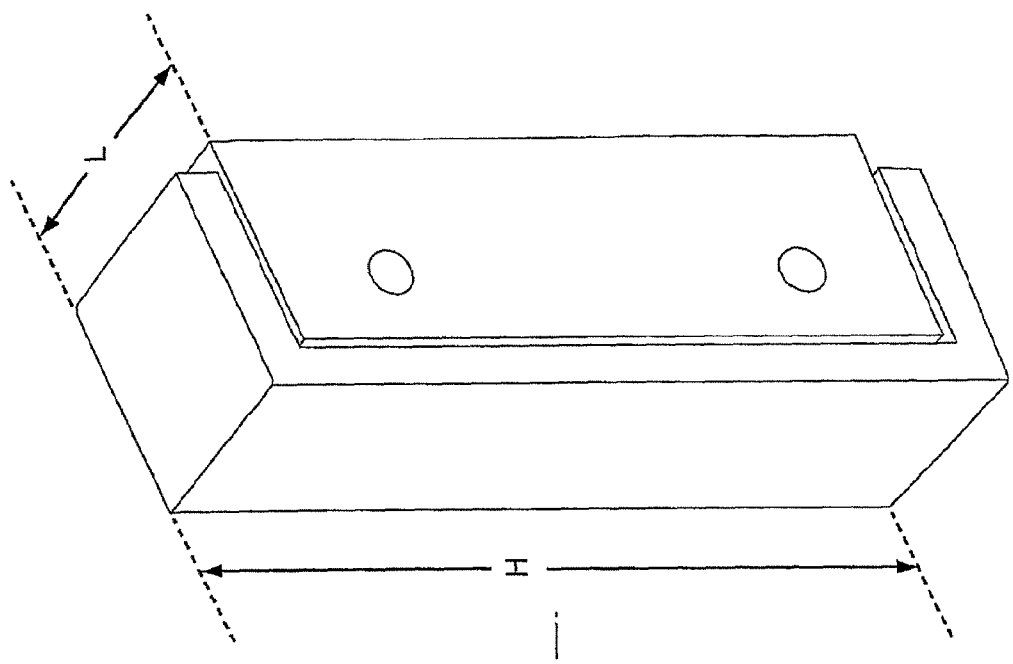
FIGS. 4 to 6 show various views of the blocking element according to the invention depicted in FIGS. 1 to 3.
Figure 5:
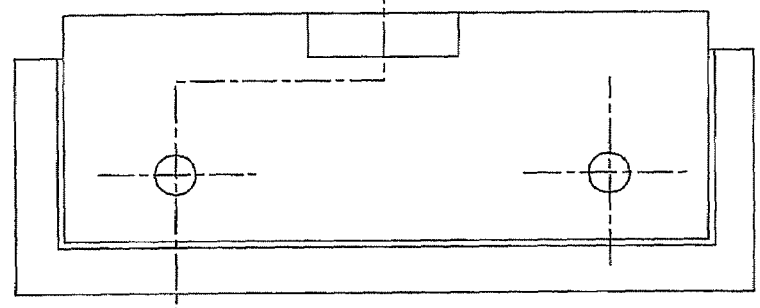
Figure 4:
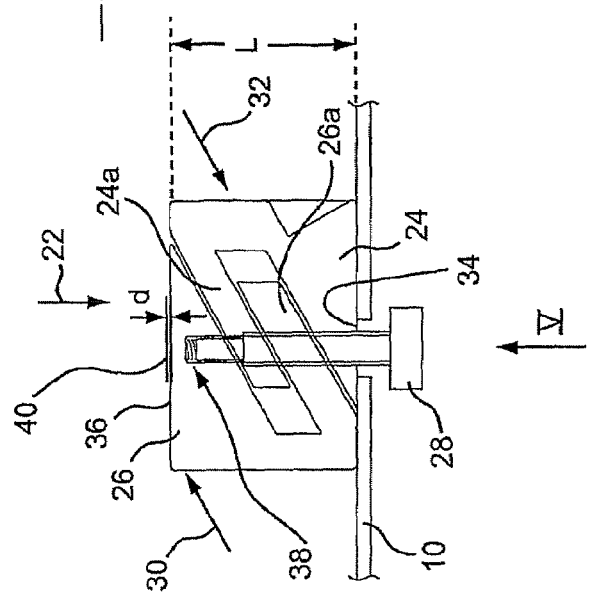

To explain the blocking element 18, reference is made to FIGS. 4 to 6, in which are depicted various views of one embodiment. FIG. 4 shows a plan view in the direction IV in FIG. 3, whereas FIG. 5 shows a side elevation in the direction V in FIGS. 3 and 4, and FIG. 6 shows an isometric view corresponding to FIG. 3.

The blocking element 18 consists of two blocking parts 24 and 26, having mutually engaging wedge-shaped areas 24a, 26a and capable of being fixed to each other and relative to each other with a fixing screw 28, as well as capable of being fixed to the front face 10 of the vehicle door 2. As is clear from FIG. 4, the blocking parts 24, 26 can be moved relative to each other in the direction of the arrows 30, 32 into an initial state with a slackened or slightly tightened fixing screw 28, whereby the mutual separation of the outer surfaces 34, 36, which corresponds to the longitudinal dimension L, can be increased. Vice versa, by pushing the blocking parts apart against the directions 30, 32, the mutual separation of the outer surfaces (longitudinal dimension) can be reduced, until the state depicted in FIG. 4 with the smallest dimension L is achieved. In any movement position, the set longitudinal dimension L can be fixed by tightening the fixing screw(s) 28 (installed state), in which, by means of the wedge-shaped design and, if need be, projections such as corrugations or similar devices on the wedge-shaped surfaces, it is ensured that even large forces acting in the force absorption direction 22 on the outer surfaces 34, 36 can be safely absorbed, without any fresh movement of the blocking parts relative to each other occurring.

FIG. 4 shows by way of a hint a spring 38, which acts between the blocking parts and pre-tensions these in a position in which the blocking element assumes its maximum longitudinal dimension, but in any case a longitudinal dimension which is greater than L1 or at least equal in size.

As is hinted in FIG. 1, it is useful to house the blocking element 18 in the area between an upper and a lower door hinge, in order first to achieve as high a fitting position as possible, because the forces to be expected can be best absorbed higher up above the door breasting. A height H of the blocking element 18, as hinted in FIG. 6, should therefore correspond to as great a portion as possible of the total door height, for example, 50%, 60%, or even 75% or more.

The blocking element 18 according to the invention is installed in a vehicle as follows. Before installing the blocking element, the vehicle door 2 is installed in the body shell and its join matched to the body shell. The blocking element is then pre-fitted on the front face 10 of the vehicle door in the initial state, i.e. the fixing screw(s) 28 is (are) tightened slightly, so that the blocking parts are attached to the door, but can still be moved relative to each other by a certain setting force (FIG. 4) acting in the force absorption direction 22. As an alternative to a slight tightening of the screw(s) 28, a spring 38 can be provided. A separator strip 40 (FIG. 4) is attached to the exposed outside 36 of the blocking part 26.

At the same time, a longitudinal dimension L is set, which is larger than the corresponding longitudinal dimension L1 of the intervening space 14. The vehicle door 2 is then closed, in which the blocking part 26 facing the A-pillar 4 comes into contact with its outer surface 36 or the separator strip 40 against the outside 12 of the A-pillar 4 before the door is completely closed. By closing the door further, an adjusting force is produced acting in the force absorption direction 22, by which the blocking part 26 is moved against the direction of the arrow 30 shown in FIG. 4 relative to the blocking element 24 connected with the door and the longitudinal dimension L of the blocking element (including the separator strip if relevant) is reduced automatically, until it almost exactly equals the longitudinal dimension L1 of the intervening space 14 with the door closed completely.

The vehicle door is then opened and the installed state produced, i.e. the fixing screw(s) 28 is/are tightened firmly. Should a noticeable reduction of the longitudinal dimension L of the blocking element 18 be produced during this process as a result of play existing between the blocking parts 24, 26, it can be stipulated that the vehicle door 2 shall not be closed completely during the adjustment, in which in this way, if necessary, a small excess in the longitudinal dimension of the blocking element compared with that of the intervening space can also be produced, so as to achieve an absolutely play- or gap-free bridging of the intervening space 14 with the door closed completely. The separator film or separator strip 40 is then removed, in order to obtain a minimum gap of approximately 1 to 2 mm (according to requirement) which prevents damage to paintwork and a build-up of noise.

By means of the automatic adjustment of the longitudinal dimension of the blocking element during assembly, a significant time saving will be achieved, as this circumvents a costly measurement and adjustment process in production.

As an alternative to the aforementioned embodiment of a blocking element of height H, the fitting of a number of shorter blocking elements could be stipulated, which can be particularly useful if the longitudinal dimension L1 of the intervening space 14 changes in height. It could also be stipulated that in addition to a blocking element fitted between the door hinges, a supplementary blocking element is to be fitted above the upper door hinge, which can be tenable throughout owing to the assembly according to the invention being labor-saving.

FIG. 7 shows an adaptation of a blocking element 18 according to the invention, in which the front blocking part 26 facing the A-pillar 4 does not have a plane outer surface, but a ball-shaped outer surface 36. The reason for this is that the swiveling axis of the vehicle door 2, about which this is rotated while closing, i.e. during the adjustment process for the blocking element 18, is relatively close to the blocking element 18, so that unfavorable relationships of the outer surface 36 can occur, if this is formed parallel to the outer face 34 of the blocking part 24 fastened to the vehicle door 2, as this is depicted in FIGS. 2 to 6. The ball-shaped, outward-facing convex form of the outer surface 36 in accordance with FIG. 7 thus represents a compromise between good adjustability and large surfaces available against the A-pillar 4.

Figure 8:
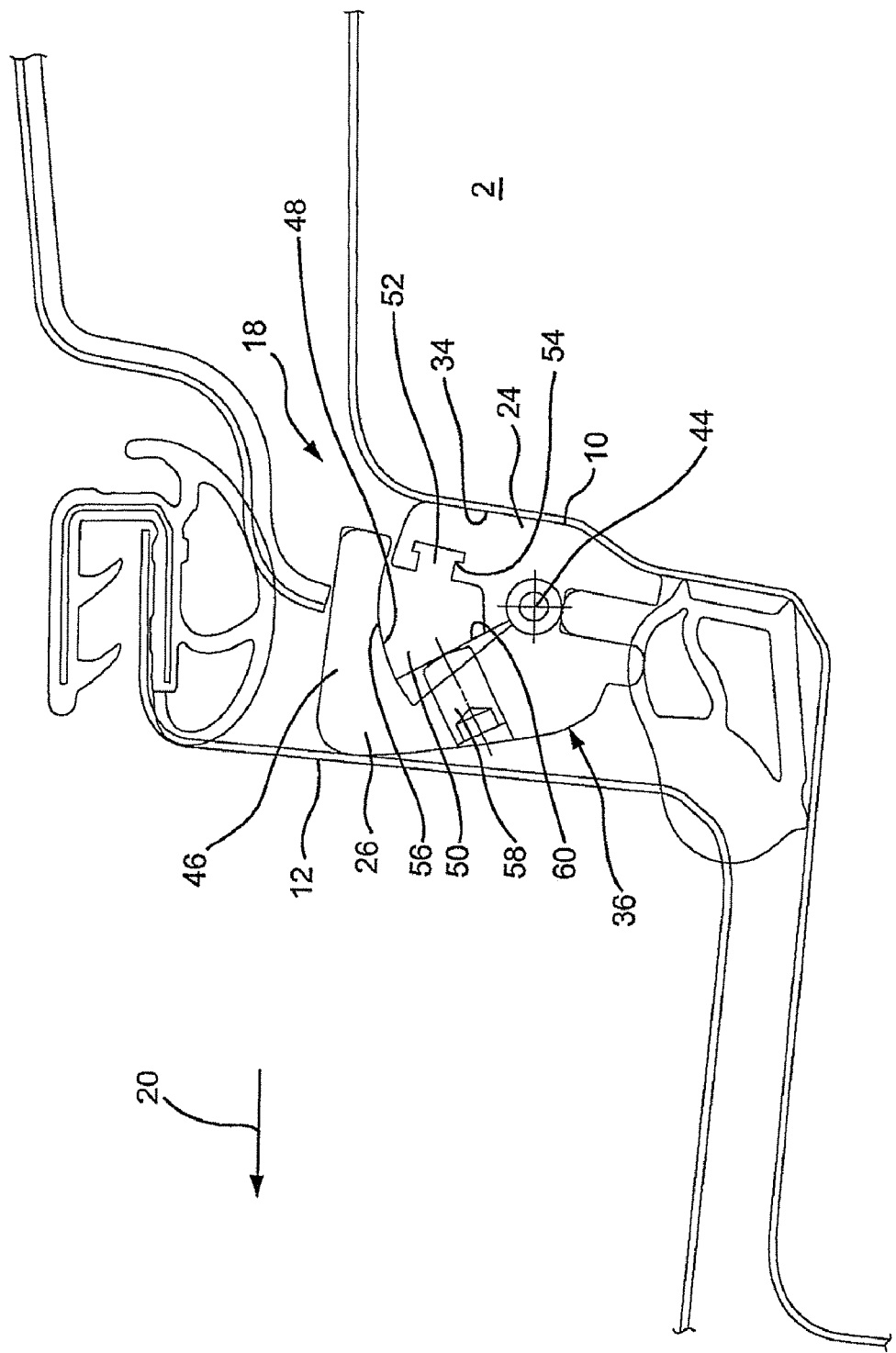
FIG. 8 shows another version of the invention in a sectional view in the horizontal plane.

FIG. 8 shows, in a view corresponding to that in FIG. 7, another version of the blocking element 18 according to the invention, in which, differently from the embodiments described earlier, not a straight line but a rotating movement of both blocking parts is stipulated. A first blocking part 24 is connected, in a way which is not depicted in detail, for example by means of screws or by welding, with the front face 10 of the vehicle door 2, while a second blocking part 26 is connected via a hinged axis 44 (at right angles to the plane of the illustration) which can be swiveled with the first blocking part 24. By means of a clockwise swiveling movement, the outer surface 36 of the second hinged element 26 can clearly be moved closer to the door 2 or the outer surface 34 of the first blocking part 24 and the aforementioned longitudinal dimension L of the blocking element 18 reduced accordingly, whereas a swiveling movement anticlockwise enlarges the longitudinal dimension L.

The second blocking part 26 has a fixing joint 46, which is provided with an inner surface in the form of a cylindrical jacket 48, in which the axis of the cylinder coincides with the axis of the hinge 44.

A locking wedge 50 is introduced movably by means of a guiding strip 52 with a T-shaped cross-section into a corresponding guide groove 54 of the first blocking part 24 in a vertical direction (at right angles to the direction of travel), having an outer surface 56 extending upwards in the form of a cone so that, by introducing the locking wedge in a vertical direction downwards from above, a clamping and locking effect between outer surface 56 and inner surface 48 and thus between second blocking part, locking wedge and first blocking part is achievable.

Advantageously, safety screws 58, the longitudinal axis of which runs tangentially to the hinge axis 44 and which can be moved against a securing surface 60 of the locking wedge 50 running tangentially to the hinge axis 44, are provided in the second blocking part 26.

A spring element, which is not illustrated, can also be provided, in order to press the blocking parts 24, 26 apart in the direction of maximum longitudinal dimension, i.e. in order to pre-stress the second blocking part 26 in FIG. 8 anticlockwise relative to the first blocking part 24.

For assembly of the blocking element 18 depicted in FIG. 8, the vehicle door 2 is closed with the blocking element 18 present in the attached, pre-fitted and initial state, in which there can also be in this case a separator film on the outer surface 36 of the second blocking element 26. The locking wedge 50 can then be placed in the guide groove 54 and driven in from above to such a distance that a firm blocking effect is achieved between both blocking parts. The securing screws 58, which were slackened in the initial state, are rotated and brought into contact with the safety surface 60, so that there is an additional security against unwanted backward movement of the blocking part 26 in the event of a crash.

What is claimed is:

1. A method for increasing the crash resistance of a motor vehicle in which, in an intervening space between a front face of a vehicle side door adjoining an A-pillar, and an outer face of the A-pillar opposite the former, is fitted a blocking element bridging the intervening space when the vehicle door is closed, the method comprising the following steps:

provision of a blocking element having two blocking parts which are connected with each other such that, in an initial state, they can be moved relative to each other under the action of an adjusting force, whereby a longitudinal dimension (L) of the blocking element is adjustable, and which can be fixed relative to each other in an initial state, so that a force arising in a crash in the direction of the longitudinal dimension (L) or the force absorption direction can be absorbed, attachment of the blocking element with the vehicle door open, in which one of the blocking parts is fastened to the front face of the vehicle door or to the outside of the A-pillar and in which the blocking parts are fitted relative to each other such that the blocking element has a greater length (L) than the intervening space when the vehicle door is closed, closing of the vehicle door, in which the other blocking part comes into contact with the A-pillar or the vehicle door and the blocking parts are moved automatically relative to each other into an assembly position, in which they fundamentally bridge completely the intervening space when the vehicle door is closed, and fixing of the blocking parts relative to each other in the assembly position.

2. The method in accordance with claim 1, wherein the blocking parts have fundamentally plane outer surface(s), with which they sit against the vehicle door and the A-pillar or are opposite each other with a slight separation.

3. The method in accordance with claim 2, wherein the outer surfaces are fundamentally parallel.

4. The method in accordance with claim 1, wherein the blocking parts are formed as wedges, in which the longitudinal dimension (L) of the blocking element is adjusted while the blocking parts are moved relative to each other at an angle to the force absorption direction of the blocking element.

5. The method in accordance with claim 1, wherein the blocking parts have mutually engaging areas, along which they are moved relative to each other, in order to adjust the longitudinal dimension (L) of the blocking element.

6. The method in accordance with claim 1, wherein the blocking parts are fixed relative to each other in the assembly position by means of at least one screw.

7. The method in accordance with claim 6, wherein the blocking element is attached simultaneously to the vehicle door or to the A-pillar by means of the at least one screw.

8. The method in accordance with claim 1, wherein before fixing to an outer surface of the other, unattached blocking part, a separator film is attached and removed after fixing, in order to avoid a contact of the outer surface with a painted surface of the A-pillar or the vehicle door.

9. A blocking element as crash support in a motor vehicle for bridging an intervening space between a front face of a side vehicle door adjacent to an A-pillar and an outer face of the A-pillar facing the former, comprising:

two blocking parts, which are connected to each other so that they can be moved relative to each other into an initial state under the action of an adjusting force, whereby a longitudinal dimension (L) of the blocking element is adjustable, and the blocking parts are permanently fixed relative to each other in an assembly position after an initial adjusting step so that, in an installed state, a force occurring in a crash can be absorbed in the direction of the longitudinal dimension (L) or the force absorption direction.

10. The blocking element in accordance with claim 9, wherein the blocking parts have fundamentally plane outer surface(s), with which they sit against the vehicle door and the A-pillar, or face each other with minimum separation.

11. The blocking element in accordance with claim 10, wherein the outer surfaces are fundamentally parallel to each other.

12. The blocking element in accordance with claim 9, wherein the blocking parts are formed as wedges, in which the longitudinal dimension (L) of the blocking element can be adjusted by moving the blocking parts relative to each other at an angle to the force absorption direction.

13. The blocking element in accordance with claim 9, wherein the blocking parts have mutually engaging areas along which they can be moved relative to each other, whereby the longitudinal dimension (L) of the blocking element can be adjusted.

14. The blocking element in accordance with either one of claims 12 and 13, wherein the engaging surfaces, along which the blocking parts can be moved, are provided with projections or corrugations, in order to avoid an unwanted movement in the installed state.

15. The blocking element in accordance with claim 9, wherein the blocking parts can be fixed relative to each other in the assembly position by means of at least one screw.

16. The blocking element in accordance with claim 15, wherein the blocking element can be attached simultaneously to the vehicle door or to the A-pillar by means of the at least one screw.

17. The blocking element in accordance with claim 9, wherein the blocking parts can be fixed relative to each other in the assembly position by welding.

18. The blocking element in accordance with claim 9, wherein a spring element is fitted between the blocking parts, in order to bring the blocking parts in the initial state into a position of maximum longitudinal dimension (L).

19. A motor vehicle comprising:

a side vehicle door fitted behind an A-pillar in which, in an intervening space between a front face of the vehicle door and an outer face of the A-pillar facing the former; and a blocking element fitted as a crash support, bridging the intervening space when the vehicle door is closed;

wherein the blocking element comprises two blocking parts, which are connected to each other so that they can be moved relative to each other into an initial state under the action of an adjusting force, whereby a longitudinal dimension (L) of the blocking element is adjustable, and the blocking parts are permanently fixed relative to each other in an assembly position after an initial adjusting step so that, in an installed state, a force occurring in a crash can be absorbed in the direction of the longitudinal dimension (L) or the force absorption direction, in which one of the blocking parts is fixed to the front face of the vehicle door or to the outside of the A-pillar, and the blocking element bridges the intervening space when the vehicle door is closed completely or until a minimum gap (d) is reached.

20. A blocking element as crash support in a motor vehicle for bridging an intervening space between a front face of a side vehicle door adjacent to an A-pillar and an outer face of the A-pillar facing the former, comprising:

two blocking parts, which are connected to each other so that they can be moved relative to each other into an initial state under the action of an adjusting force, whereby a longitudinal dimension (L) of the blocking element is adjustable, and the blocking parts are permanently fixed relative to each other in an assembly position by means of at least one screw after an initial adjusting step so that, in an installed state, a force occurring in a crash can be absorbed in the direction of the longitudinal dimension (L) or the force absorption direction.

* * * * *